July 23, 1957
H. O. SCHERENBERG
2,800,118
FOUR-CYCLE INTERNAL COMBUSTION ENGINE HAVING FUEL INJECTION MEANS
Filed March 23, 1954
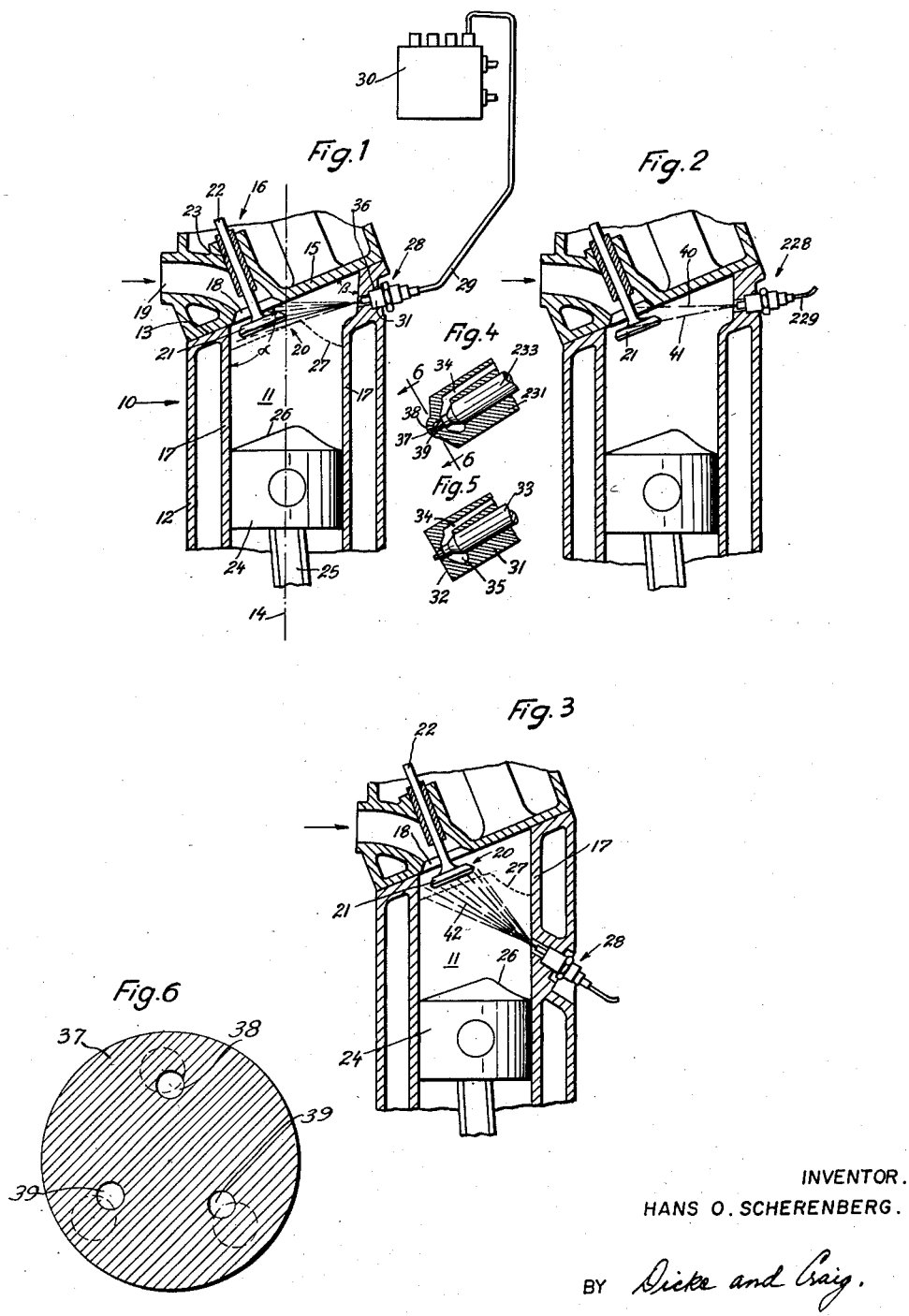
INVENTOR.
HANS O. SCHERENBERG.
BY *Dicke and Craig.*
ATTORNEYS.

United States Patent Office 2,800,118
Patented July 23, 1957

2,800,118
FOUR-CYCLE INTERNAL COMBUSTION ENGINE HAVING FUEL INJECTION MEANS

Hans O. Scherenberg, Stuttgart-Heumaden, Germany, assignor to Daimler-Benz Aktiengesellschaft, Stuttgart-Unterturkheim, Germany Application March 23, 1954, Serial No. 418,193

Claims priority, application Germany March 24, 1953

7 Claims. (Cl. 123—32)

My invention relates to a four-cycle internal combustion engine having fuel injection means and adapted to compress the fuel mixture produced in the cylinder or cylinders of the engine by the fuel injection.

More particularly, the present invention relates to an internal combustion engine of the type indicated in which the cylinder has a plane end wall extending obliquely to the axis of the cylinder, said end wall being provided with an inlet valve having a stem extending at right angles to the oblique end wall.

It is an object of the present invention to provide an internal combustion engine of the character described in which the jet of fuel injected into the cylinder is directed in direct opposition to the stream of air entering the cylinder substantially in the direction of the stem of the inlet valve, and in which such portions of the jet as will hit the end face of the cylinder do so at a comparatively large angle so as to be better reflected and as to be less liable to be condensed, whereby an improved processing of the air-fuel mixture in the course of the compression stroke following the injection of the fuel will be attained.

It is a further object of the present invention to so dispose the fuel injection device in the wall of the cylinder that the direction of the fuel jet injected conforms in an improved manner to the direction of the stem of the inlet poppet valve, whereby a comparatively extended path is rendered available to the injected fuel so as to ensure at the outset that a large portion of the air filling the cylinder space is mixed with fuel.

Finally, it is an object of the present invention to so dispose the fuel injection device that the sensitive nozzle is located in a sheltered position being protected by the piston from the effect of the hot combustion gases in the early phase of the combustion.

Further objects of the present invention will appear from the description following hereinafter of a number of preferred embodiments of the present invention which are illustrated in the accompanying drawing, and the features of novelty will be pointed out in the claims, it being understood that the following description serves the purpose of illustrating the invention rather than that of limiting the same. In the drawings, Fig. 1 is an axial section through a cylinder of an internal combustion engine provided with an injection device of the plug type, Fig. 2 is a sectional view similar to that of Fig. 1 of a cylinder of an internal combustion engine provided with an injection device of the multi-nozzle type, in both embodiments the injection device being disposed in the compression space of the cylinder, Fig. 3 is an axial section taken through a cylinder of an internal combustion engine provided with an injection device of the plug type, such device being disposed adjacent to the piston displacement space, Fig. 4 is an axial section through the front portion of a well known injection device of the multi-nozzle type, Fig. 5 is a view similar to that of Fig. 4 of a well known injection device of the type having a single plug-controlled nozzle, and Figure 6 is a cross sectional view on a slightly enlarged scale taken along line 6—6 of Figure 4.

The cylinder block 10 of the internal combustion engine is formed with a plurality of cylinders, such as 11, provided with cooling jackets 12, such cylinder block 10 having a plane end face 13 extending obliquely to the axis 14 of the cylinder 11. Moreover, the cylinder 11 has a plane end wall 15 which, in the embodiment shown, is formed by the cylinder head 16 mounted on the oblique face 13 of the cylinder block. As a result, the plane end wall 15 forms an obtuse angle $\alpha$ with the peripheral wall 17 of the cylinder 11 at the left side of the cylinder, as shown in Fig. 1, and wall 15 forms an acute angle $\beta$ at the right hand side of the peripheral wall 17. The inclined end wall 15 is formed with an air inlet 18 located in proximity to the apex of angle $\alpha$ and communicating with an air inlet duct 19 with which the cylinder head 16 is formed. The inlet 18 is controlled by a poppet valve designated by 20 as a whole, which is comprised of a disk-shaped valve head 21 and a stem 22 integral therewith. The stem 22 is slidably guided in a bushing 23 mounted in a suitable bore of cylinder head 16 and extends substantially at right angles to the end wall 15.

In the cylinder 11 a piston 24 is mounted for reciprocation by the customary crankshaft (not shown) and connecting rod 25, whereby the end face 26 of piston 24 is movable between a position adjacent to said inlet valve indicated by the dotted line 27 and a position remote from the inlet valve, as shown in Fig. 1. The inlet valve 20 is controlled by suitable means including the customary cam shaft geared to the crankshaft and adapted to open the inlet valve 20, while the piston 24 recedes therefrom so as to suck air through duct 19 into the cylinder 11.

During this phase of the operation fuel is injected by an injection device 28 into the compression space in the upper part of cylinder 11 above the position 27 of the piston end face 26. For this purpose, the injection device 28 is mounted in a bore 36 provided in the peripheral wall 17 of the cylinder 11 near the apex of angle $\beta$, i. e. on the side opposite to that where the inlet 18 is located. The injection device 28 is connected by a pipe 29 to a suitable fuel pump 30 of conventional design, such pump being so geared to the crankshaft or the cam shaft of the engine as to feed fuel through pipe 29 to the injection device 28 during that phase of the cycle of operation in which the air is sucked by the receding piston 24 through inlet 18 while the valve 20 is held open.

The injection device may be of any well known type, but is preferably of the type having a body 31 (Fig. 5) provided with a single injection nozzle centrally disposed in its end face 32 and normally engaged and sealed by an axially movable spring-pressed plug member 33. When the fuel is fed under pressure through a conduit 34 of body 31 into an annular space 35, the pressure of the fuel withdraws the plug member 33 from the nozzle thereby opening the same, whereupon the fuel issues from the nozzle under pressure in form of a finely divided conical spray which is intimately mixed with the stream of air entering the cylinder 11. Thus, it is shown in Fig. 1 that the conical spray will meet the inflowing air head on, such air flowing past that portion of valve disk 21 as is in opposed relationship to the injection device.

The embodiment shown in Fig. 2 differs from that illustrated in Fig. 1 by the type of injection device inserted in the bore 36. This injection device 228 shown in Fig. 4 is provided with three injeection nozzles. The three nozzles are provided in a dome-shaped front portion 37 of the body 231 of the injection device. One of the three nozzles is formed by an upper bore 38 and the two other nozzles are formed by a pair of adjacent bores 39 disposed at the same level. The nozzles 38 and 39 are controlled by an axially movable plug member 233 which is similar to the plug member 33 described hereinabove and operated in the manner described by fuel fed to the injection device through a pipe 229 by a fuel pump not shown similar to pump 30. The upper nozzle 38 is directed towards the opposed portion of the periphery of the valve disk 21 when the valve is in its closed position, such direction being indicated by the dotted line 40. The two nozzles 39, however, are directed tangentially with respect to the valve disk 21 when the valve is in its opened position, such directions being indicated by the dotted line 41.

In both embodiments illustrated in Figs. 1 and 2 the axis of the injection device is slightly downwardly inclined towards the inlet 18.

The embodiment illustrated in Fig. 3 differs from those shown in Figs. 1 and 2 by the location of the injection device in that the latter is mounted in the peripheral wall 17 of the cylinder 11 intermediate the upper position 27 and the lower position shown of end face 26 of the piston 24. The injection device 28 may be of the single nozzle type shown in Fig. 5. It is upwardly inclined towards the inlet 18 and is preferably shaped to issue a jet of atomized fuel having the shape of a hollow cone 42 which embraces the inlet valve 20 in its opened condition. As a result, the fuel particles will meet the in-rushing air rather than the disk portion 21 of the valve 20.

The disposition of the injection device shown in Fig. 3 adjacent to the piston displacement space offers the advantage that the direction of the jet 42 may better conform to the direction of the valve stem 22, whereby the fuel particles will travel a longer distance and are thus at the outset distributed over a larger portion of the cylinder space. Moreover, the sensitive nozzle portion of the injection device is disposed in a sheltered position so as to be better protected by the piston from the effect of the hot combustion gases during the early phase of the combustion.

An important feature of my invention is the disposition of the inlet valve in that portion of the inclined end wall 15 of the cylinder which forms the obtuse angle α with the peripheral wall 17 of the cylinder, since owing to such arrangement the fuel jet will extend through the greater portion of the diameter of the cylinder 11. Owing to the inclined disposition of the end wall 15 of the cylinder, such portions of the jet as will hit such end wall will do so at a steeper angle, whereby the jet will be better reflected and is less liable to condense on the wall. This improves the processing of the fuel-air mixture preparatory to the ignition which is effected by a suitable spark plug not shown.

While I have described my invention with reference to a number of embodiments thereof, I wish it to be clearly understood that the same is in no way limited to the details described, but is capable of numerous modifications within the scope of the appended claims.

What I claim is:

1. Four-cycle internal combustion engine comprising a cylinder forming a combustion space and having a peripheral wall and a plane end wall extending obliquely to the axis of the cylinder, said end wall forming an obtuse angle with said peripheral wall of the cylinder at one side of the latter and an acute angle at the opposite side thereof, said end wall having an air inlet located in proximity to said one side of said peripheral wall, a slidable inlet poppet valve adapted to control said inlet and having a stem extending at right angles to said end wall, a piston in said cylinder, and a fuel injection device mounted in said peripheral wall on said opposite side thereof so as to face an opposed portion of the periphery of said poppet valve, said injection device injecting at least a part of the fuel in a direction essentially opposite to that of the air stream flowing into said combustion space past said opposed portion of the periphery of said valve.

2. Four-cycle internal combustion engine comprising a cylinder providing a combustion space and having a peripheral wall and a plane end wall extending obliquely to the axis of the cylinder, said end wall forming an obtuse angle with said peripheral wall of the cylinder at one side of the latter and an acute angle at the opposite side thereof, said end wall having an air inlet located in proximity to said one side of said peripheral wall, a slidable inlet poppet valve adapted to control said inlet and having a stem extending at right angles to said end wall, a piston in said cylinder, a fuel injection device mounted in said peripheral wall on said opposite side thereof so as to face an opposed portion of the periphery of said poppet valve, and a fuel pump connected to said fuel injection device and geared to the engine so as to feed fuel to said injection device when said inlet valve is open and said piston recedes therefrom, said injection device injecting at least a part of the fuel in a direction essentially opposite to that of the air stream flowing into said combustion space past said opposed portion of the periphery of the opened valve.

3. Four-cycle internal combustion engine comprising a cylinder providing a combustion space having a plane end face extending obliquely to the axis of the cylinder, a cylinder head fitted on said end face and constituting an end wall of said cylinder forming an obtuse angle with the internal peripheral wall of the cylinder at one side of the latter and an acute angle at the opposite side thereof, said end wall having an air inlet located in proximity to said one side of peripheral wall, a slidable inlet poppet valve adapted to control said inlet and having a stem slidably guided in said cylinder head and extending at right angles to said end wall, a piston in said cylinder, and a fuel injection device mounted in said peripheral wall on said opposite side thereof so as to face an opposed portion of the periphery of said poppet valve, said injection device injecting at least a part of the fuel in a direction essentially opposite to that of the air stream flowing into said combustion space past said opposed portion of the periphery of said valve upon opening thereof.

4. Four-cycle internal combustion engine comprising a cylinder having a peripheral wall and a plane end wall extending obliquely to the axis of the cylinder, said end wall forming an obtuse angle with said peripheral wall of the cylinder at one side of the latter and an acute angle at the opposite side thereof, said end wall having an air inlet located in proximity to said one side of said peripheral wall, a slidable inlet poppet valve adapted to control said inlet and having a stem extending at right angles to said end wall, a reciprocatory piston in said cylinder having an end face movable between a position adjacent to said inlet valve and a position remote from said inlet valve, and a fuel injection device mounted in said peripheral wall of the cylinder intermediate said positions on said opposite side of said peripheral wall so as to face an opposed portion of the periphery of said poppet valve, whereby said injection device is adapted to inject fuel into the air stream sucked by said piston into said cylinder when said valve opens.

5. The combination claimed in claim 2 in which said fuel injection device has a single injection nozzle and an axially movable plug member normally engaging said nozzle and adapted to be withdrawn therefrom by the pressure of the fuel fed to said device.

6. The combination claimed in claim 2 in which said fuel injection device is provided with three injection nozzles, one of said nozzles being directed towards said opposed portion of the periphery of said poppet valve when the latter is in its closed position, while the other two of said nozzles are directed tangentially with respect to said poppet valve when the latter is in its opened position.

7. The combination claimed in claim 2 in which said fuel injection device is adapted to produce a jet of atomized fuel having the shape of a hollow cone embracing said poppet valve in its opened condition.

References Cited in the file of this patent

UNITED STATES PATENTS

| | | |
|---|---|---|
| 2,016,734 | Wittenberg et al. | Oct. 8, 1935 |
| 2,028,760 | Dillstrom | Jan. 28, 1936 |

FOREIGN PATENTS

| | | |
|---|---|---|
| 359,545 | Great Britain | Oct. 26, 1931 |
| 684,873 | Great Britain | Dec. 24, 1952 |
| 689,659 | Great Britain | Apr. 1, 1953 |
| 873,831 | France | July 21, 1942 |